United States Patent

[11] 3,577,051

| [72] | Inventor | Herbert R. Montague<br>Binghamton, N.Y. |
|---|---|---|
| [21] | Appl. No. | 825,617 |
| [22] | Filed | May 19, 1969 |
| [45] | Patented | May 4, 1971 |
| [73] | Assignee | Power Concepts Corporation<br>Hallstead, Pa. |

[54] MOTOR SPEED CONTROL CIRCUIT HAVING VARIABLE REACTIVE IMPEDANCE MEANS
5 Claims, 2 Drawing Figs.

[52] U.S. Cl. .................................................. 318/212,
318/227, 318/229
[51] Int. Cl. ...................................................... H02p 3/24
[50] Field of Search ........................................... 318/211,
212, 227, 228, 229

[56] References Cited
UNITED STATES PATENTS

| 1,563,084 | 11/1925 | Harris.......................... | 318/227 |
| 2,119,205 | 5/1938 | Doyle et al.................... | 318/227X |
| 2,304,604 | 12/1942 | Schweitzer, Jr. ............. | 318/227 |
| 2,419,431 | 4/1947 | Williams....................... | 318/212X |

Primary Examiner—Oris L. Radar
Assistant Examiner—Gene Z. Rubinson
Attorney—Kenneth P. Johnson ABSTRACT: A speed control circuit for induction motors, such as the shaded-pole type, in which a pair of oppositely poled, parallel-connected diodes are connected between an alternating current source and the motor. There is a variable resistor in series with one of the diodes to vary the direct current component supplied to the motor and control the motor speed. A saturable reactor is included in series with the diodes to also vary the circuit impedance and thereby reduce the energy dissipation required at low motor speeds.

PATENTED MAY 4 1971          3,577,051

INVENTOR
HERBERT R. MONTAGUE 3,577,051

MOTOR SPEED CONTROL CIRCUIT HAVING VARIABLE REACTIVE IMPEDANCE MEANS

BACKGROUND OF THE INVENTION

The control of speed in induction motors is highly desirable in many limited power applications, for example, in small pumps and fans. Several circuits have been devised which can provide varying accuracy of speed control for induction motors, such as shaded-pole motors, which are suitable for these applications. Most of these circuits use the known method of varying the magnitude of the direct current component which is combined with the alternating current supplied to the motor.

The control circuits generally use a rectifier or transistor to produce the direct current component and vary the motor speed by varying the magnitude of the alternating current with a variable resistor. These arrangements, however, have the drawbacks of using expensive components and having to dissipate the heat generated at prolonged low speeds. Inadequate dissipation, of course, shortens the components' life and alters their values and characteristics.

Accordingly, it is an object of this invention to provide a novel motor control apparatus in which the magnitude of the alternating and direct current excitation can be varied directly with the motor speed change.

Another object of this invention is to provide a motor speed controller having a wide dynamic range in which sustained low speed operation has little detrimental effect and in which the problem of heat dissipation is substantially reduced.

A further object of this invention is to provide a simplified speed control circuit for a shaded-pole motor having a wide dynamic range of control, yet is relatively inexpensive to construct.

The present invention achieves its range of speed control by connecting a pair of oppositely-poled diodes in parallel and including a variable resistor in series with one of the diodes so that the resistor is effective during alternate half cycles. The resistor adjustment controls the direct current component supplied to the motor and accordingly varies the motor speed. Optionally included in the supply circuit is a saturable reactor which is effective to vary the alternating current excitation as a function of the variable resistor setting. The saturable reactor is further provided with means to change the range of speed adjustment.

With the semiconductor diodes and resistor in the circuit of the invention, the cost of the motor control is significantly reduced. The use of a saturable reactor further aids in reducing the quantity of energy to be dissipated and provides control of the range of adjustment which is often highly desirable.

The above and further objects, features and advantages of the invention will be better understood from the following detailed description taken with reference to the accompanying drawing, forming part of this specification, wherein:

FIG. 1 is a schematic diagram of a motor speed control circuit constructed in accordance with the invention; and FIG. 2 is a schematic diagram of the control circuit of FIG. 1 modified to include a saturable reactor as a variable impedance.

DETAILED DESCRIPTION

Figure 1:
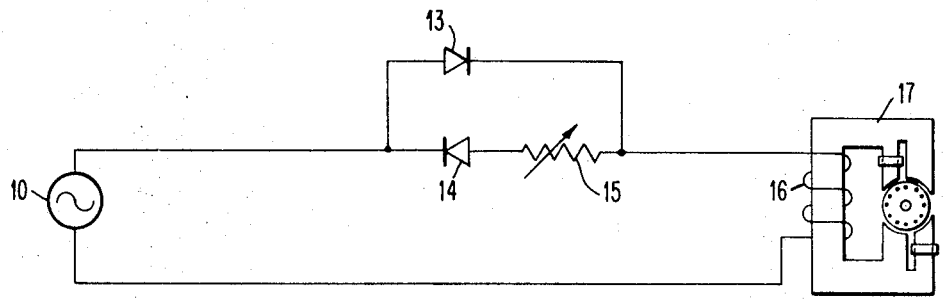

Referring to FIG. 1, an alternating current source 10 is commonly connected to a parallel circuit of oppositely poled, half-wave rectifying devices such as semiconductor diodes 13 and 14. Diode 14 is connected in series with variable resistor 15 and the parallel circuits are, in turn, connected to the energizing winding 16 of shaded-pole motor 17. The energizing winding completes the circuit by being coupled to AC source 10.

In operation current flows first in one direction through diode 13 and then in the opposite direction through diode 14 during opposite half cycles. By adjusting variable resistor 15, the magnitude of the supplied voltage for alternate half cycles, and hence, the current, can be adjusted to control the speed of motor 17. The adjustment varies the direct current component supplied to the motor and, in effect, shifts the voltage value about which the supply alternates to some value other than zero. By means of this adjustment the speed can be varied from maximum to minimum speed with a close degree of control and with inexpensive components.

Figure 2:
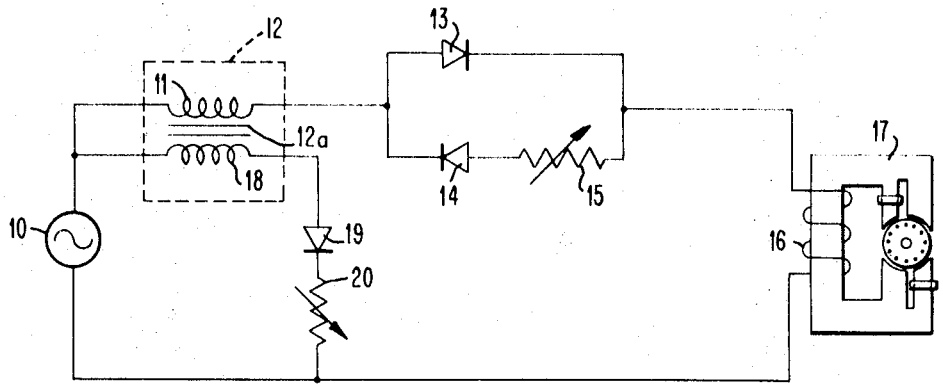

In operating the motor at prolonged low speeds heating is experienced with the circuit of FIG. 1. Low speed applications therefore present difficulty in dissipating the energy. By incorporating a saturable core reactor in the supply circuit further control can be exercized over the total impedance of the circuit to reduce the dissipation required. Such a modification is shown in FIG. 2. As seen in FIG. 2, source 10 is connected to one end of main winding 11 of a saturable core reactor, indicated generally at 12. The other end of main winding 11 is commonly connected to the oppositely-poled parallel diodes 13 and 14. As described above, diode 14 is connected in series with variable resistor 15 and the parallel circuits are connected in common to winding 16 of motor 17. The other end of the winding 16 returns the circuit to the source of potential 10. A gate winding 18 of saturable reactor 12 is connected at one end of source 10 and at the other end to a diode 19 in series with a variable resistor 20. Resistor 20 returns to the opposite side of source 10.

During operation the core of saturable reactor 12 displays a hysteretic effect in which the induced magnetic flux varies in proportion to the current through its windings. Assuming a balanced condition with resistor 15 being set to zero resistance, saturable reactor 12 offers a low reactive impedance. The net direct current in the gate winding 18 saturates the core 12a and causes it to have minimal impedance and negligible AC voltage drop across the main winding. Alternatively, with the adjustment of the variable resistor 15 set to produce the maximum direct current component, the reactor 12 becomes unsaturated so that the AC impedance increases causing more AC voltage drop across the reactor and less across the load. Resistor 15 thus provides control of motor speed with a corresponding variation in the AC impedance which reduces motor heating. Variable resistor 20 in the gate winding 18 of the reactor can be adjusted as desired to select the range of impedance variation in the saturable reactor produced with resistor 15 when controlling motor speed. It is to be noted that diode 19 can be replaced with a full wave rectifier bridge if it is desired to increase the effectiveness of the gate winding to full cycle operation.

It is to be understood that the invention is not limited to the embodiments shown here, but may be varied in form and construction within the purview of the appended claims.

I claim:

1. A speed control circuit for an alternating current electric motor comprising:
   a stator winding in said motor operable when energized to actuate said motor;
   rectifying means connected between a source of alternating current and said winding;
   a variable resistance device connected in parallel with said rectifying means between said source and said winding for varying the magnitude of the current supplied to said winding during alternate half cycles of said source; and
   magnetic means in said circuit operable in response to adjustment of said resistance device for varying the distribution of the impedance in said control circuit by changing the reactive impedance of said magnetic means.

2. Apparatus as described in claim 1 wherein said magnetic means includes a first winding in series with said source and said rectifying means and a second winding connected across said source.

3. Apparatus as described in claim 2 wherein said second winding includes half-wave rectifying means in series therewith to limit the effectiveness of said reactance means to alternate half cycles.

4. Apparatus as described in claim 2 wherein said second winding includes full-wave rectifying means in series therewith to limit the effectiveness of said reactance means to each half cycle.

5. Apparatus as described in claim 2 wherein said second winding includes a variable resistor in series therewith to alter the range of effectiveness of said magnetic means.